April 13, 1937.  C. MOORE  2,076,912

VOLTAGE STABILIZER AND CIRCUIT THEREFOR

Filed July 26, 1934   2 Sheets-Sheet 1

Inventor:
Clyde Moore,
By Banning & Banning
Attys.

April 13, 1937.                C. MOORE                    2,076,912
                VOLTAGE STABILIZER AND CIRCUIT THEREFOR
                Filed July 26, 1934            2 Sheets-Sheet 2

Inventor:
Clyde Moore,
By Banning & Banning
Attys.

Patented Apr. 13, 1937

2,076,912

UNITED STATES PATENT OFFICE 2,076,912

VOLTAGE STABILIZER AND CIRCUIT THEREFOR

Clyde Moore, Chicago, Ill.

Application July 26, 1934, Serial No. 737,041

3 Claims. (Cl. 171—229)

An object of this invention is to provide a system for stabilizing the excitation of motors when used as prime movers wherein the excitation is instantaneous and effective when the load varies from full load to no load, or vice versa, as well as for stabilizing for varying loads on generators.

This circuit is designed to cause each motor or generator which it is individually applied to operate at its highest efficiency. That is to maintain the power factor of the motor or generator at or near unity while operating under widely varying load conditions.

Another object is to provide an improved form of stabilizer for the purpose which will be more instantaneously responsive to changes in the load, voltage, etc.

These and other objects, as will hereinafter appear, are accomplished by this invention, which is fully described in the following specification and shown in the accompany drawings, in which—

Figure 1:
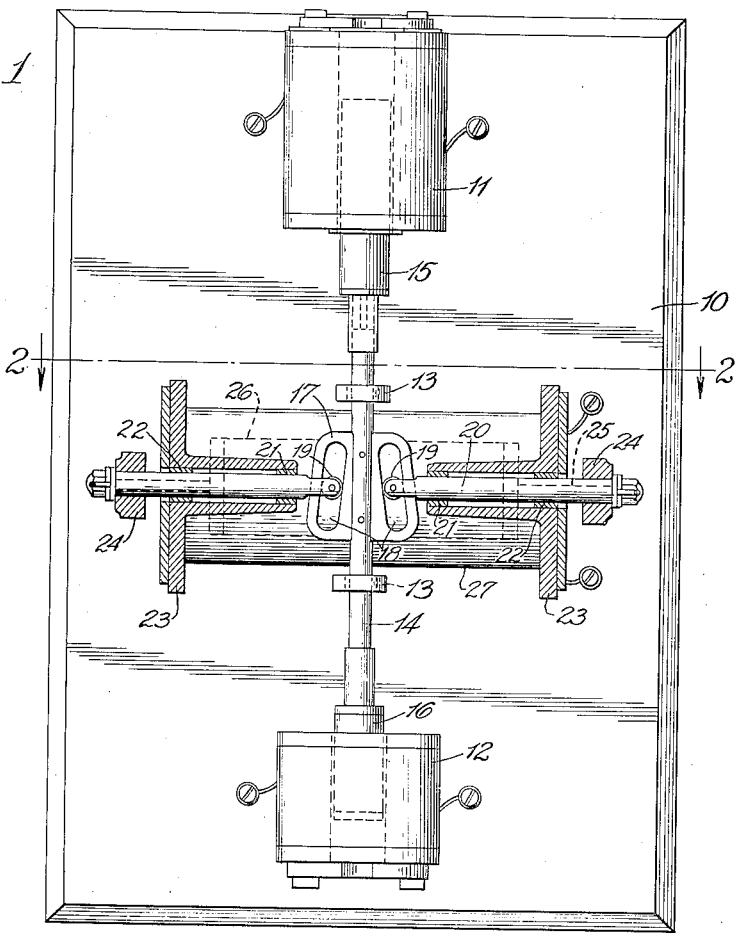
Figure 1 is a front elevation of the voltage stabilizer mounted on a suitable panel.
Figure 2:
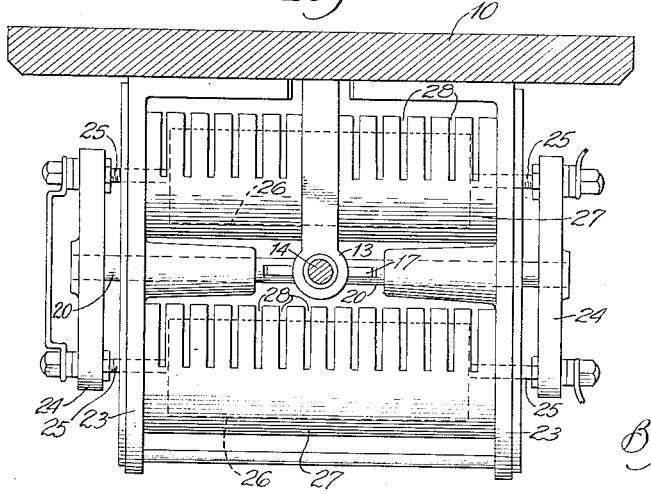
Fig. 2 is a horizontal section on the line 2—2 of Fig. 1.

The embodiment of the voltage stabilizer, shown in Figs. 1 and 2, comprises a panel 10 on which is mounted a voltage coil 11 and a current coil 12, the panel also carrying guides 13 in which is slidably mounted a vertical rod 14, to the ends of which are connected cores 15, 16 for the coils 11 and 12, respectively, the core 15 being normally somewhat below the coil 11, while the coil 16 is normally somewhat above the coil 12. The rod 14 carries a plate 17 in which are formed upwardly converging cam slots 18. Cam follower rollers 19 are mounted on pins on the ends of horizontal rods 20, which are slidably mounted in suitable bearings 21, 22 in housing members 23 which in turn are secured to the panel 10. These rods are connected at their outer ends to yokes 24 in which are adjustably mounted screws 25 (Fig. 2) which press from opposite ends on carbon piles 26. The details of this carbon pile construction, which forms no part of the present invention, are shown in my co-pending application Serial No. 704,651, filed December 30, 1933. These carbon piles are supported on suitable insulating members (not shown), and are enclosed within hollow shield members 27 which are provided with slots 28 for the purpose of ventilation of the carbon pile resistance.

In general, the weight of the parts 14, 15, 16, and 17 tends to cause the cam to draw the rods 20 toward each other, thereby compressing the carbon pile and decreasing its resistance. Current flowing through the voltage coil 11 tends to lift the vertical rod 14, thereby decreasing the resistance of the carbon pile while current through the current coil 12 has an opposite effect.

Figure 3:
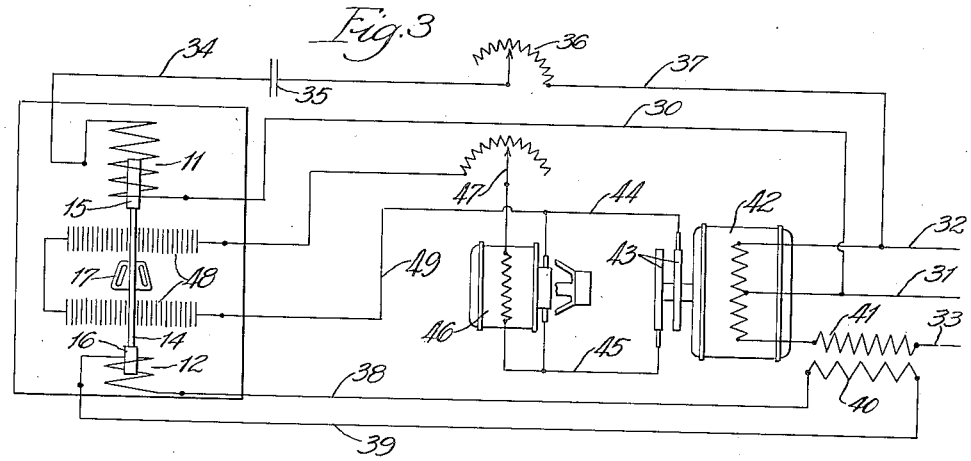
Fig. 3 is a wiring diagram of one method of connecting the voltage stabilizer in the circuit of an alternating current generator or motor.

One circuit for using the voltage regulator is shown diagrammatically in Fig. 3 in which one end of the voltage coil 11 is connected through a lead 30 with a wire 31 of a three phase alternating current circuit, the other wires of this circuit being 32 and 33. The other end of the voltage coil 11 connects through a lead 34 with a suitable electrolytic condenser 35 in series therewith with a voltage preset rheostat 36, the latter connecting through a lead 37 with the wire 32 of alternating current three phase line.

The current coil 12 connects through leads 38, 39 with the secondary 40 of a current transformer, the primary 41 of which is series connected to the lead 33. The opposite end of the primary, as well as the leads 31 and 32, are connected to the field coils of the alternating current generator or motor 42. The slip rings 43 of the motor or generator connect through leads 44, 45 to the commutator brushes of the exciter 46 which is suitably driven by any means, not shown. The field of the exciter is connected in series of the armature to the lead 45, and thence to an exciter field rheostat 47. The carbon pile rheostat 48 forming part of the voltage stabilizer, as shown in Figs. 1 and 2, are preferably in series with each other and with the exciter field rheostat 47, and thence through a lead 49 with the lead 44.

In this wiring diagram the carbon piles 48 of the voltage stabilizer are connected in series with the exciter field rheostat so that all the current of the field of the exciter passes through these carbon pile resistances. This is permissible in small installations where the field current is not too large. For larger installations, however, the voltage stabilizer may be placed in parallel with the exciter field rheostat, as will later be described in connection with Fig. 4.

From the foregoing it will be understood that with the motor 42 driving a piece of machinery, such as an air compressor, not shown, whose load will suddenly vary from zero load to full load, or vice versa, the power factor of the motor 42 will be caused to change through wide limits, with the result that much more energy will be expended in driving the motor than is absolutely necessary. To correct for this the voltage stabilizer, as described herein, is employed. Thus when the motor 42 is driving an air compressor to which no load is applied, and when a full load is suddenly applied thereto, the motor 42 draws a heavy current through the primary coil 41 and induces a heavy current through the secondary coil 40, with the result that the current coil 12 of the voltage stabilizer becomes energized thereby drawing down on the rod 14 of the voltage stabilizer, thus compressing the carbon pile resistance 48 and causing a heavier current to flow through the field coil of the exciter 46 which induces a heavier current in the slip rings 43 of the motor 42. This in turn increases the excitation of the motor and restores its power factor substantially to unity. At the same time the voltage across the alternating current supply lines 31, 32 varies somewhat, but later than the variation in the current amperage passing through the line 33, with the result that the voltage coil 11 tends to equalize the action of the voltage regulator which, however, acts much more instantaneously due to the presence of the current coil 12 which acts with gravity on the rod 14 to compress the carbon pile resistance, while the voltage coil 11 tends to lift the stem and to relieve the carbon pile resistance from this pressure.

The electrolytic condenser 35 placed as it is in series with the voltage coil 11 tends to correct for the lag introduced by the heavy inductance of this coil, so that its action is greatly speeded up making it more instantly responsive to changes in the voltage of the line. The drop in the amperage of the alternating current supply line takes place in advance of changes in the voltage of the line when a load is suddenly applied thereto, and this change of amperage instantly makes itself felt through the action of the current coil 12.

Figure 4:
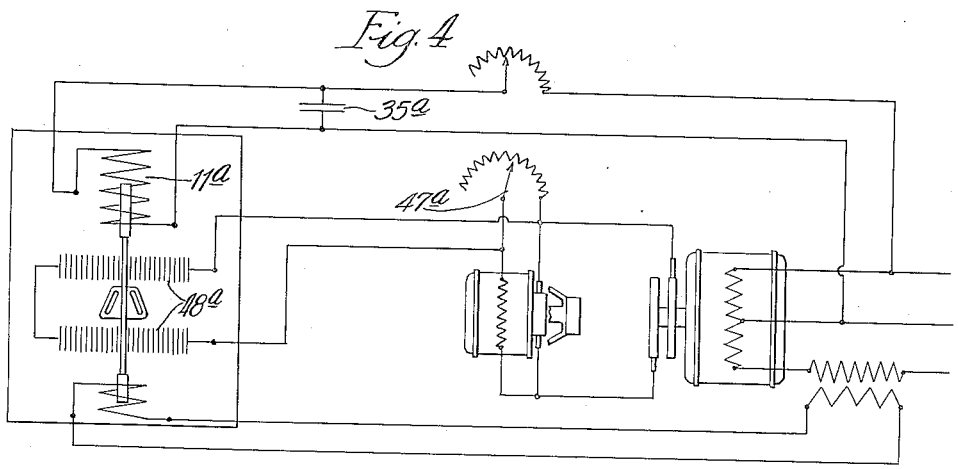
Fig. 4 is a wiring diagram showing another method of connecting it in circuit.

The condenser 35ª of Fig. 4 is placed in parallel with the voltage coil 11ª instead of in series with it as in Fig. 3. Also the carbon pile resistances 48ª are placed in parallel with the exciter field rheostat 47ª instead of being in series with it as in Fig. 3. By this method of connecting the carbon pile rheostat it takes substantially none of the exciter field current at no load, but assists the field rheostat in taking its peak load. Consequently, the same carbon pile resistance by this arrangement is able to be used with very much larger exciters.

These devices have been described in connection with circuits including an alternating current motor driving an extremely variable load, such as an air compressor. For best results one of these should be placed in circuit with each motor. It will be understood, however, that this voltage stabilizer can be used in connection with an alternating current generator to automatically correct for changes in load on the line.

While I have shown and described but a few embodiments of my invention, it is to be understood that it is capable of many modifications. Changes, therefore, in the construction and arrangement may be made which do not depart from the spirit and scope of my invention as disclosed in the appended claims.

I claim:

1. In a voltage stabilizer, a carbon pile, means for variably compressing the carbon pile including a cam attached to a vertical rod so as to be movable therewith, guides for the rod, iron cores carried by the rod, one core above and one below the cam, the rod and the parts carried thereby constituting a weight applied to the cam, a voltage coil around one core, and a current coil around the other core for moving the rod as the voltage and current of the line vary.

2. In a voltage stabilizer, a carbon pile, means for variably compressing the carbon pile including a cam attached to a vertical rod so as to be movable therewith, guides for the rod, iron cores carried by the rod, one core above and one below the cam, the rod and the parts carried thereby constituting a weight applied to the cam, a voltage coil around the upper core, and a current coil around the lower core for moving the rod as the voltage and current of the line vary.

3. In a voltage stabilizer, two horizontal parallel spaced carbon piles, a frame for supporting the same, a yoke at each end of the piles, pressure fingers carried by said yokes and adapted to bear on the ends of the carbon piles, guides for said yokes, means for variably applying pressure to the two yokes including a cam attached to a vertical rod so as to be movable therewith, guides for the rod, iron cores carried by the rod, one core above and one below the cam, the rod and the parts carried thereby constituting a weight applied to the cam, a voltage coil around one core, and a current coil around the other core for moving the rod as the voltage and current of the line vary.

CLYDE MOORE.